(12) United States Patent
Cisewski et al.

(10) Patent No.: US 7,079,347 B2
(45) Date of Patent: Jul. 18, 2006

(54) METHOD AND APPARATUS FOR PROVIDING A MARKER FOR ADAPTIVE FORMATTING VIA A SELF-SERVOWRITE PROCESS

(75) Inventors: Paul M. Cisewski, Morgan Hill, CA (US); Blake Finstad, San Juan Bautista, CA (US); Peter Kui Ho, Morgan Hill, CA (US); Kishan Kumar Kumbla, Morgan Hill, CA (US); Daniel J. Malone, San Jose, CA (US); Scott Arthur Thomas, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 396 days.

(21) Appl. No.: 10/289,106

(22) Filed: Nov. 6, 2002

(65) Prior Publication Data

US 2004/0085669 A1 May 6, 2004

(51) Int. Cl.
*G11B 21/02* (2006.01)

(52) U.S. Cl. .......................................................... 360/75

(58) Field of Classification Search ................... 360/75, 360/22, 48, 78.14
See application file for complete search history.

(56) References Cited

U.S. PATENT DOCUMENTS

| 4,644,418 | A | 2/1987 | Banno et al. |
| 5,784,216 | A | 7/1998 | Zaharris |
| 6,259,575 | B1 | 7/2001 | Thomas, III et al. |
| 6,324,026 | B1 | 11/2001 | Thomas, III |
| 6,341,045 | B1 | 1/2002 | Hironaka et al. |
| 6,344,942 | B1 * | 2/2002 | Yarmchuk .................... 360/75 |
| 6,501,608 | B1 * | 12/2002 | Buch ........................... 360/48 |
| 2001/0024337 | A1 | 9/2001 | Thomas, III et al. |

* cited by examiner

*Primary Examiner*—David Hudspeth
*Assistant Examiner*—Mitchell Slavitt
(74) *Attorney, Agent, or Firm*—Crawford Maunu PLLC

(57) ABSTRACT

A method and apparatus for providing a marker at the end of the adaptive self-servowrite process for adaptive formatting via the self-servowrite process. The mark is used later in the drive manufacturing process to identify the number of tracks written on the surface and thus determine the appropriate format to use in the drive.

29 Claims, 6 Drawing Sheets

METHOD AND APPARATUS FOR PROVIDING A MARKER FOR ADAPTIVE FORMATTING VIA A SELF-SERVOWRITE PROCESS

BACKGROUND OF THE INVENTION

1. Field of the Invention

This invention relates in general to magnetic storage systems, and more particularly to a method and apparatus for providing a marker for adaptive formatting via a self-servowrite process.

2. Description of Related Art

Magnetic recording systems that utilize magnetic disk and tape drives constitute the main form of data storage and retrieval in present-day computer and data processing systems. In the recording process, information is written and stored as magnetization patterns on the magnetic recording medium. Scanning a write head over the medium and energizing the write head with appropriate current waveforms accomplish this recording process. In a read-back process, scanning a read sensor over the medium retrieves the stored information. This read sensor intercepts magnetic flux from the magnetization patterns on the recording medium and converts the magnetic flux into electrical signals, which are then detected and decoded.

Continually increasing storage capacities in hard disk drives require innovations in magnetic hard disk drive design. One area of concern is the need for precision manufacturing. Hard disk drives store data in concentric tracks, and the density of those tracks has increased along with linear bit density over time. To read and write data, the disk drive head must remain accurately centered on a selected track. At today's track densities, the head must stay centered on the narrow tracks to within a staggering tolerance of one-millionth of an inch or less. To achieve this level of precision, the head must read position information along the track that is permanently written onto the disk. The position information is used by a precision electronics control system that servos the recording head onto the track.

The process by which the position information is written onto the disks is referred to as servowriting and is performed only once—during the manufacture of the device. The information remains on the disk for the life of the product. The machines that write these servo patterns—called servowriters—must be very precise instruments.

Traditional servo writing has been performed in a clean room environment with external sensors invading the head disk assembly to provide the precise angular and radial position information to write the servo patterns. For example, an external clock head was typically disposed on the disk outer diameter. This provided the angular information used to write the servo patterns. While such instruments have been satisfactory to set the patterns in the past, today's increased track density has become so precise that the mechanical vibration of the file (relative to these external sensors) as well as other factors can limit the accuracy or increase the complexity of these systems.

A more precise servowriting technology has been developed to overcome the problems associated with the traditional servo writing process. The new approach uses servowrite self-timing technology. The clock heads used in traditional servowriters is replaced with an electronic non-invasive process to create the time alignment of servo patterns between adjacent tracks.

A digital signal processor executing a predetermined mathematical algorithm is used to accomplish the time alignment. In this method, the hard disk drive generates its own timing information while the drive is being servo written, using only the product data head. The patterns are self-propagated and aligned by a digital signal processor (DSP), resulting in a substantial increase in time alignment over other servowriting methods and significantly improved performance, quality, and reliability.

The self-servowrite process eliminates mechanical vibrations associated with external clocking while significantly improving servo pattern time alignment. This results in fewer servo errors—and thus fewer write inhibits—to improve drive performance. The improved time alignment also enables a reduction in the size of the sector fields, thereby increasing data capacity. The self-servowrite process also eliminates external invasive clock heads, which can damage the drives during manufacture. Thus, the drive leaves the manufacturing facility with a clean bill of health, having been assembled and tested in a manner to preserve its quality and integrity.

Improved time alignment in the servo pattern fields means fewer servo substitutions, which further increases data reliability. Additionally, the self-servowrite process includes in-process algorithms to detect and correct servowriter errors as they occur. The result of this monitoring of the servowriting process (catching and correcting errors "on the fly") is that disk drives are servo written with fewer errors. This improves product quality and makes the manufacturing process more efficient—all of which can reduce the cost for end users.

Nevertheless, for adaptive formatting, wherein the number of available data tracks can vary, the number of tracks to be formatted must be determined. Currently, determining the number of available tracks from the self servowrite process requires a trial and error process or requires that the track count be sent ahead from the servowriter to the function test station.

It can then be seen that there is a need for a method and apparatus for identifying the number of tracks written on the surface and thus determine the appropriate format to use in the drive.

SUMMARY OF THE INVENTION

To overcome the limitations in the prior art described above, and to overcome other limitations that will become apparent upon reading and understanding the present specification, the present invention discloses a method and apparatus for providing a marker for adaptive formatting via a self-servowrite process.

The present invention solves the above-described problems by providing a marker at the end of the adaptive self-servowrite process that can be used to identify the number of tracks written on the surface and thus determine the appropriate format to use in the drive.

A method in accordance with the principles of the present invention includes performing an adaptive self-servowrite process to write tracks to a recording surface, writing a marker at a predetermined location on the recording surface, the marker indicating the number of tracks written during the adaptive self-servowrite process, prior to formatting, locating the marker, processing the marker to determine a number of tracks written during the adaptive self-servowrite process, ascertaining an appropriate formatting based upon the determined number of tracks indicated by the marker and formatting the recording surface according to the ascertained format.

In another embodiment of the present invention, a servo written recording medium is provided. The servo written recording medium includes a number of tracks written during an adaptive self-servowrite process and a marker disposed at a predetermined location on the recording surface, wherein the marker indicates the number of tracks written during the adaptive self-servowrite process.

In another embodiment of the present invention, a storage system is provided. The storage system includes a moveable storage medium having a recording surface for storing data thereon, a motor for causing movement of the moveable storage medium, an actuator assembly having an actuator arm and a sensor disposed at a distal end of the actuator arm, the sensor for reading and writing data on the disk, a servo controller, operatively coupled to the actuator assembly and sensor, the servo controller providing a drive signal to the actuator assembly for moving the actuator arm relative to the recording medium, the servo controller performing an adaptive self-servowrite process to write a number of tracks to a recording surface, writing a marker at a predetermined location on the recording surface, the marker indicating the number of tracks written during the adaptive self-servowrite process, prior to formatting, locating the marker, processing the marker to determine number of tracks written during the adaptive self-servowrite process, ascertaining an appropriate formatting based upon the determined number of tracks indicated by the marker and formatting the recording surface according to the ascertained format.

In another embodiment of the present invention, an article of manufacture comprising a program storage medium readable by a computer is provided. The medium tangibly embodies one or more programs of instructions executable by the computer to perform a method for providing adaptive formatting via a self-servowrite process, the method includes performing an adaptive self-servowrite process to write tracks to a recording surface, writing a marker at a predetermined location on the recording surface, the marker indicating the number of tracks written during the adaptive self-servowrite process, prior to formatting, locating the marker, processing the marker to determine a number of tracks written during the adaptive self-servowrite process, ascertaining an appropriate formatting based upon the determined number of tracks indicated by the marker and formatting the recording surface according to the ascertained format.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiments in which the invention may be practiced. It is to be understood that other embodiments may be utilized as structural changes may be made without departing from the scope of the present invention.

The present invention provides a method and apparatus for providing a marker for adaptive formatting via a self-servowrite process. The mark is used later in the drive manufacturing process to identify the number of tracks written on the surface and thus determine the appropriate format to use in the drive.

Figure 1:
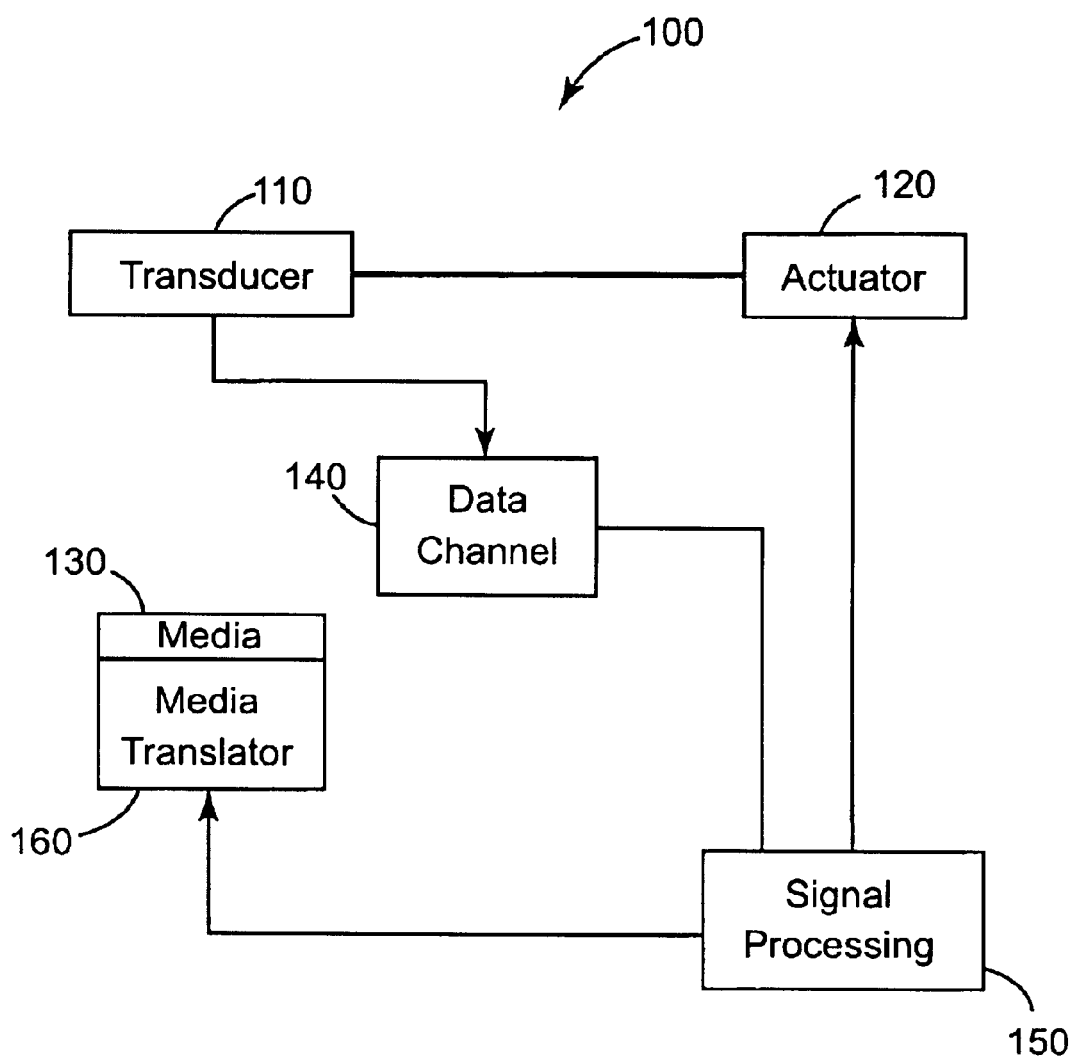
FIG. 1 illustrates a storage system according to the present invention.

FIG. 1 illustrates a storage system 100. In FIG. 1, a transducer 110 is under control of an actuator 120. The actuator 120 controls the position of the transducer 110. The transducer 110 writes and reads data on magnetic media 130. The read/write signals are passed to a data channel 140. A signal processor 150 controls the actuator 120 and processes the signals of the data channel 140. In addition, a media translator 160 is controlled by the signal processor 150 to cause the magnetic media 130 to move relative to the transducer 110. The present invention is not meant to be limited to a particular type of storage system 100 or to the type of media 130 used in the storage system 100.

Figure 2:
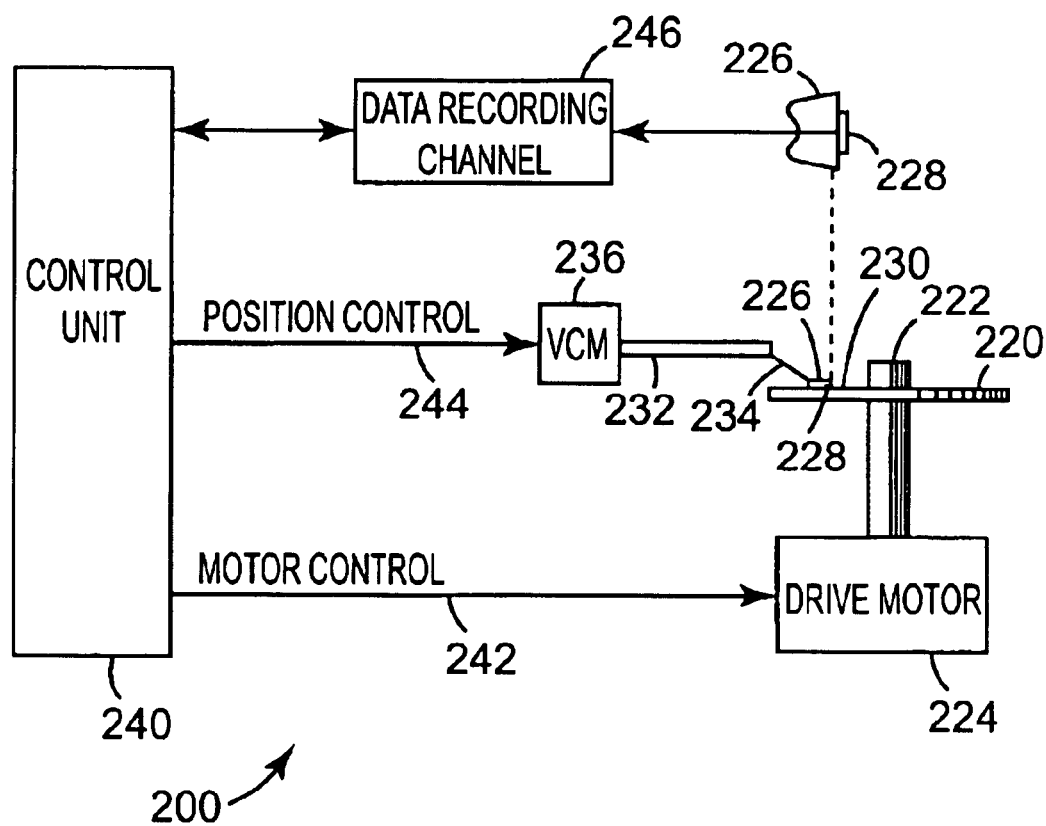
FIG. 2 is an illustration of one example of a magnetic disk drive storage system.

FIG. 2 is an illustration of one example of a magnetic disk drive storage system 200. As shown in FIG. 2, at least one rotatable magnetic disk 220 is supported on a spindle 222 and rotated by a disk drive motor 224. The magnetic recording media on each disk 220 is in the form of an annular pattern of concentric data tracks (not shown).

At least one slider 226 is positioned on the disk 220, each slider 226 supporting one or more magnetic read/write heads 228. As the disk(s) 220 rotate, slider 226 is moved radially in and out over disk surface 230 so that heads 228 may access different portions of the disk 220 where desired data is recorded. Each slider 226 is attached to an actuator arm 232 by means of a suspension 234. The suspension 234 provides a slight spring force, which biases slider 226 toward the disk surface 230. Each actuator arm 232 is attached to an actuator 236. The actuator 236 may be a voice coil motor (VCM). The VCM has a coil movable within a fixed magnetic field, the direction and speed of the coil movements being controlled by motor current signals supplied by a control unit 240.

During operation of the disk drive 200, the rotation of the disk 220 generates an air bearing between slider 226 and the disk surface 230, which exerts an upward force or lift on the slider 226. The surface of the slider 226, which includes head 228 and faces the surface of disk 220, is referred to as an air-bearing surface (ABS). The air bearing thus counterbalances the slight spring force of suspension 234 and, during normal operation, supports the slider 226 off of, and slightly above, the disk surface 230 at a small, substantially constant spacing.

The various components of the disk drive 200 are controlled in operation by control signals generated by a control unit 240, such as access control signals and internal clock signals. Typically, control unit 240 has logic control circuits, storage apparatus, and a microprocessor. The control unit 240 generates control signals to control various system operations such as drive motor control signals on line 242 and head position and seek control signals on line 244. The control signals on line 244 provide the desired current profiles to optimally move and position the slider 226 to the desired data track on the disk 220. Read and write signals are communicated to and from read/write heads 228 through recording channel 246.

The above description of a typical magnetic disk drive storage system 200 is provided for representation purposes only. It should be apparent that disk storage systems may contain a large number of disks and actuators, and that each actuator may support a number of sliders. Many other variations of the basic typical magnetic disk drive storage system 200 may be used in conjunction with the present invention while keeping within the scope and intention of the invention. However, those skilled in the art will recognize that the present invention is not meant to be limited to magnetic disk drive storage systems as illustrated in FIG. 2.

Figure 3:
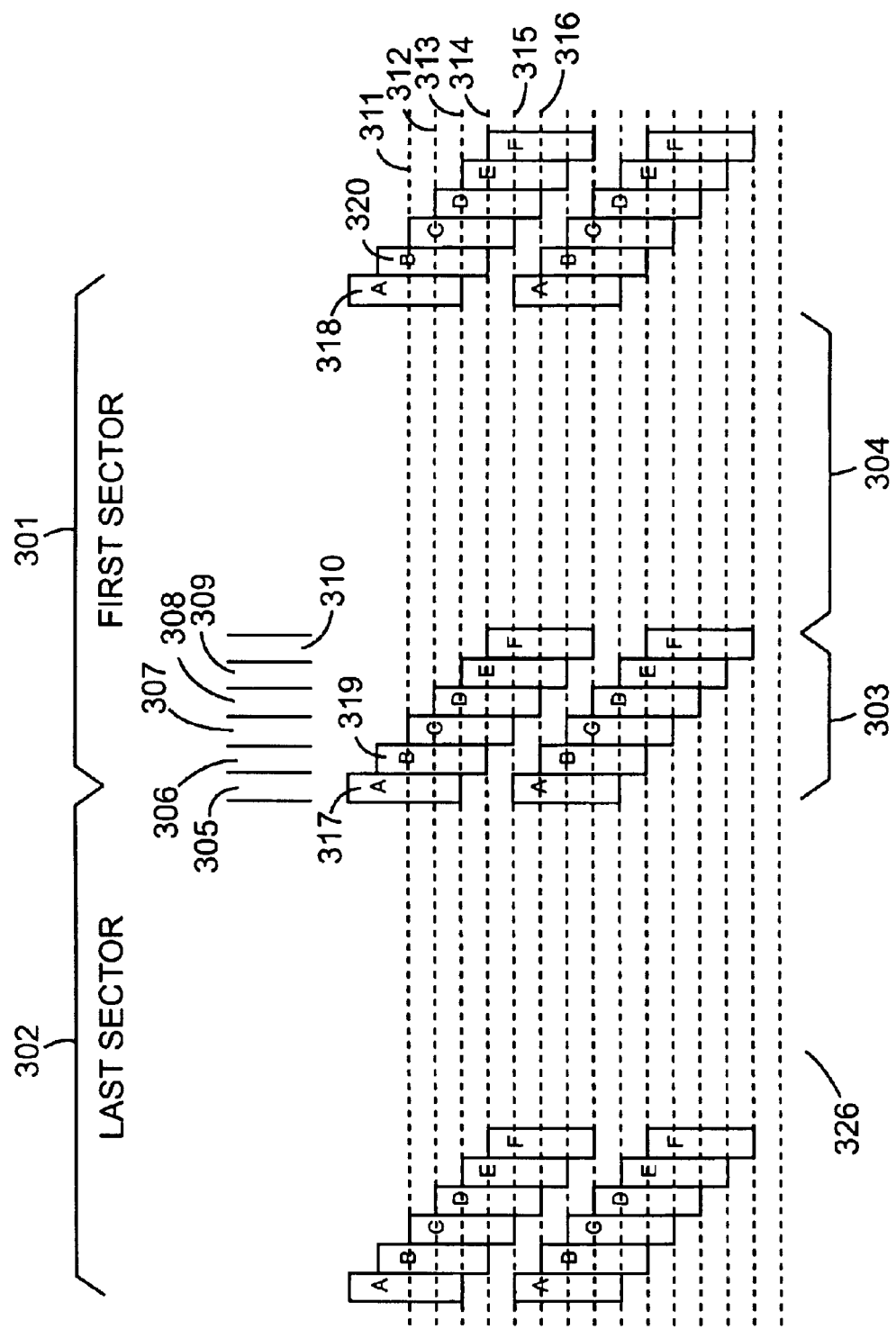
FIG. 3 shows a diagram of a portion of a recording medium.

FIG. 3 shows a diagram of a portion of recording medium 326 illustrating the division into a number of propagation tracks 311, 312, 313, etc. as well as a division of each track into a number of sectors, with a first sector 301 typically coming immediately after the disk rotation index as determined either by an index pulse from the disk spindle motor driver or from the timing controller. Each sector is further divided into a region 303 containing the amplitude bursts for propagation and a region 304, which is reserved for the use of the precision timing propagation system and for writing the actual product servo pattern including sector ID fields and either amplitude burst or phase encoded patterns. Propagation burst areas 303 may be overwritten with user data following servowriting. All of region 304 except for the part containing the product servo pattern will also be overwritten with user data. Each propagation burst region is further divided into a number of slots 305–310 within which the amplitude burst patterns (A,B,C,D,E, and F) for propagation are written. In FIG. 3, the propagation track pitch is shown as one quarter of the assigned data track width. For example, if the first user data track is chosen to be centered on propagation track 312, the next data track would be centered on propagation track 316, and so on across the disk. Other ratios of propagation to data track pitch can be used, but the 4:1 ratio shown allows fine adjustment of the timing of grey code bits and phase encoded product servo patterns.

Typically, the data track pitch is chosen to be slightly larger than the transducer write width so the edges of adjacent data tracks do not overlap. This can be seen in FIG. 3 by noting the relative radial locations of B and F bursts since these correspond to the above-mentioned choices of data tracks centered on propagation tracks 312 and 316 respectively. The propagation burst pattern shown consists of a repeating sequence of 6 bursts. This is useful because the bursts in each slot do not overlap along the radial direction thereby allowing the recording transducer to back up and read previously written bursts. The minimum number of slots required for propagation without such checking is 2. While the above description has been provided to show the data tracks and the servo functions, those skilled in the art will recognize that the present invention is not meant to be limited to the configuration shown.

Figure 4:
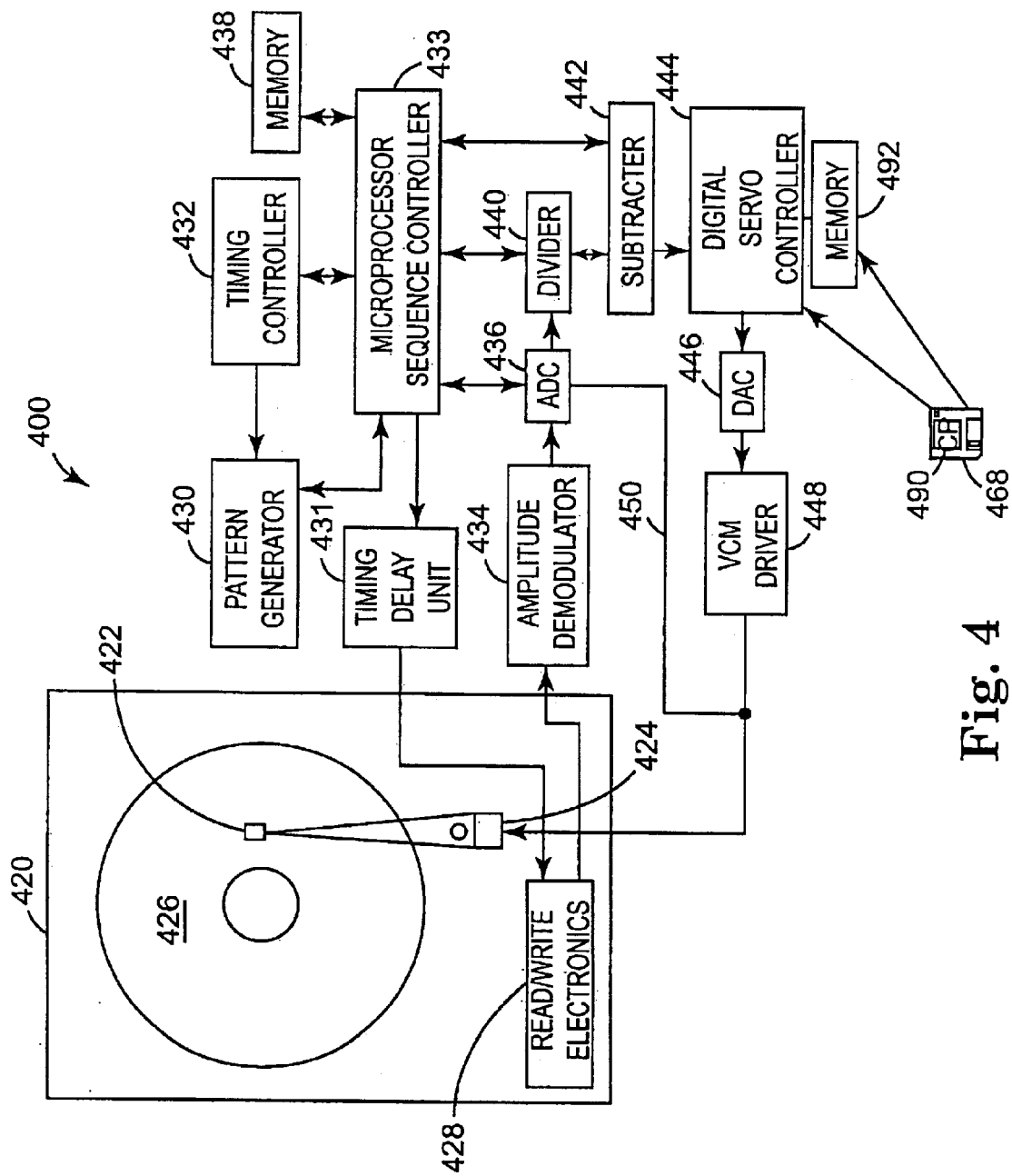
FIG. 4 shows the major components of a self-servowriting disk drive according to the present invention.

FIG. 4 shows the major components of a self-servowriting disk drive 400 according to one embodiment of the present invention. A disk drive 420 with its recording transducer 422, voice coil actuator 424, recording medium or disk 426, and read/write control electronics 428, is connected to a time delay unit 431 in series with a pattern generator 430, which is clocked by a timing controller 432 that allows bursts of magnetic transitions to be recorded at precisely controlled times.

A readback signal from a file read/write electronics circuit 428 is connected to an amplitude demodulator circuit 434, the output of which is converted to digital form by an analog to digital converter (ADC) 436 at times determined by timing controller 432 acting in concert with a microprocessor sequence controller 433. Sequence controller 433 also accesses a memory 438 for storage and retrieval of digitized readback amplitudes used by a divider 440. Sequence controller 433 with memory 438 also provide for the storage and retrieval of reference table values used by a subtracter 442 in creating the position error signal (PES) that serves as the input to a digital servo controller 444. Sequence controller 433 also provides computation capabilities for general use in determining modifications to the stored reference table values and for determining appropriate delay settings to be applied to timing delay unit 431, and producing control signals for pattern generator 430.

The output of digital servo controller 444 is converted to analog form by a digital to analog converter (DAC) 446, and is further amplified and converted to a current by a VCM driver 448. The driver current 450 is applied to voice coil motor (VCM) 424 in the disk file causing recording transducer 422 to move approximately radially with respect to recording medium 426. The functions of divider 440, subtracter 442, and digital servo controller 444 may be all achieved through the appropriate programming of microprocessor sequence controller 333.

Figure 5:
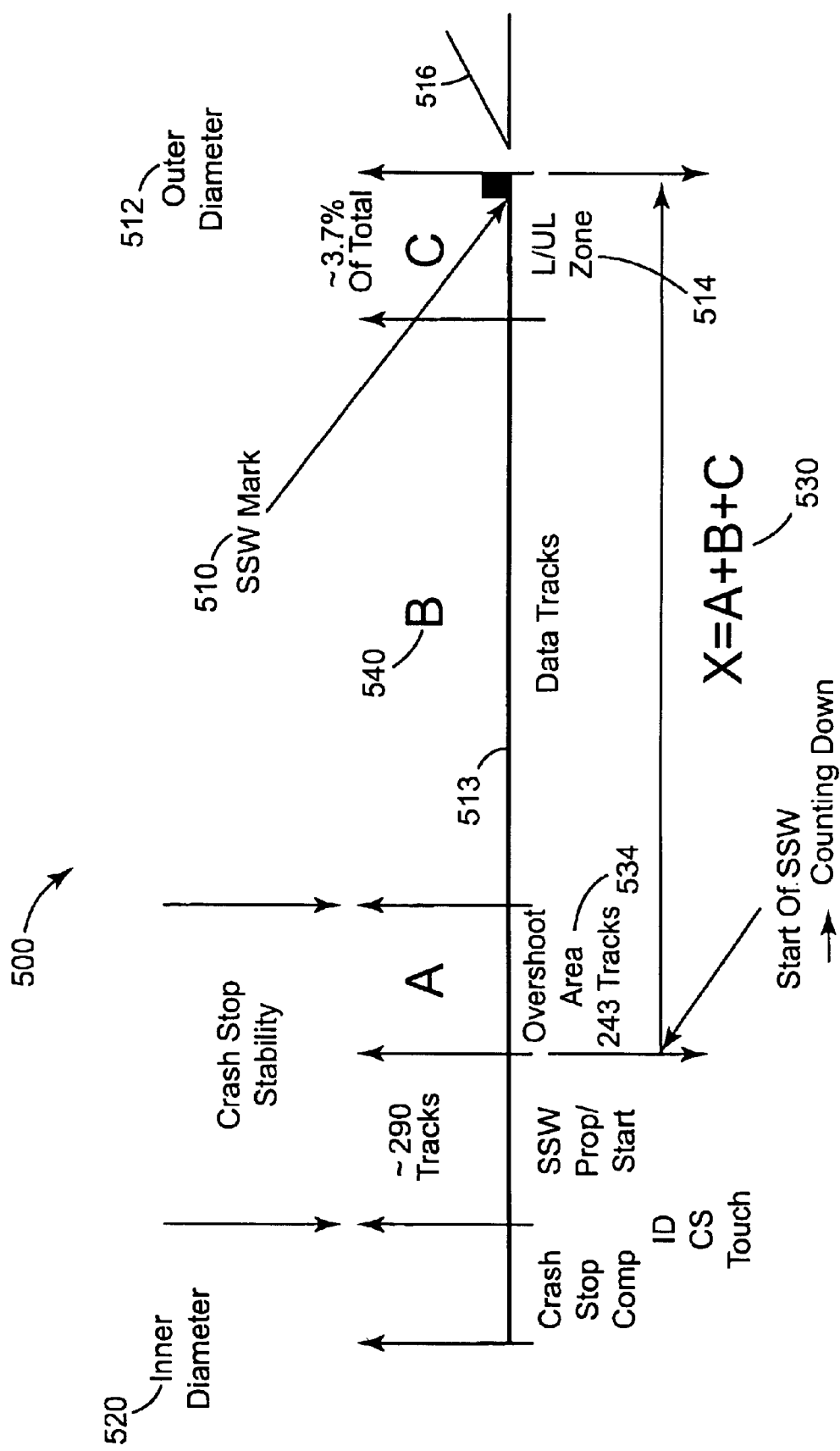
FIG. 5 illustrates a cross-sectional view of a disk layout according to the present invention.

FIG. 5 illustrates a cross-sectional view of a disk layout 500 according to the present invention. In FIG. 5, a mark (SSW mark) 510 is added at the end of the adaptive self-servowrite process. The SSW mark 510 is written as a sequence of N-tracks at the outer edge 512 of the recording surface 513 just inside ramp 516. When the drive is turned off and the slider is not flying, the slider lands on ramp 516 disposed adjacent the load/unload zone 514 outside the disk and rests till the next power-on cycle. The SSW mark 510 is used later in the drive manufacturing process to identify a number of tracks written on the surface 513 and thus determine the appropriate format to use in the drive. The pattern for the SSW mark 510 is unique and easily recognizable by the demodulator of the servo controller 444 of FIG. 4.

Alternatively, the drive may utilize a Contact Start Stop (CSS) mode. While the disk is stopped, the head contacts the disk. When the disk begins rotation, the head floats. When the disk stops rotating, the head contacts the disk again, thus the name Contact Start Stop (CSS) mode. In CSS mode, the head is put in an unstable floating state and slides and wears the disk surface each time the disk starts or stops rotating. Accordingly, some storage systems designed to perform CSS in an area (CSS zone or load/unload zone such as illustrated as 514 in FIG. 5) separate from the data area so as to prevent damage to the data area during CSS. Further, the SSW mark 510 could be placed at any predetermined position, such as the inner edge of the recording surface.

Referring to FIGS. 4 and 5, a special servo command is used by the servo controller 444 at function test to look for the SSW mark 510. Once the SSW mark 510 is found, the servo controller 444 moves the head 422 toward the inner edge 520, but just inside the edge of the SSW mark 510. At that location, the head reads the grey code servo address and then, based on this reading, calculates the number of available data tracks 530. Once the number of available data tracks 530 is known, the appropriate format to be used during the adaptive format process can be determined. Thus, the present invention provides a reliable method to identify the number of available tracks 530.

In FIG. 5, an overshoot area 534 of 243 tracks is provided at region A. The load/unload zone 514, i.e., region C, is approximately 3.7% of the total number of tracks 530. Thus, knowing the total number of tracks, as provided by the SSW mark 510, allows a calculation of the number of data tracks in region B 540 and the number of tracks in the load/unload zone 514 of region C. From the total number of tracks 530, the appropriate format may be used during the adaptive format process.

Figure 6:
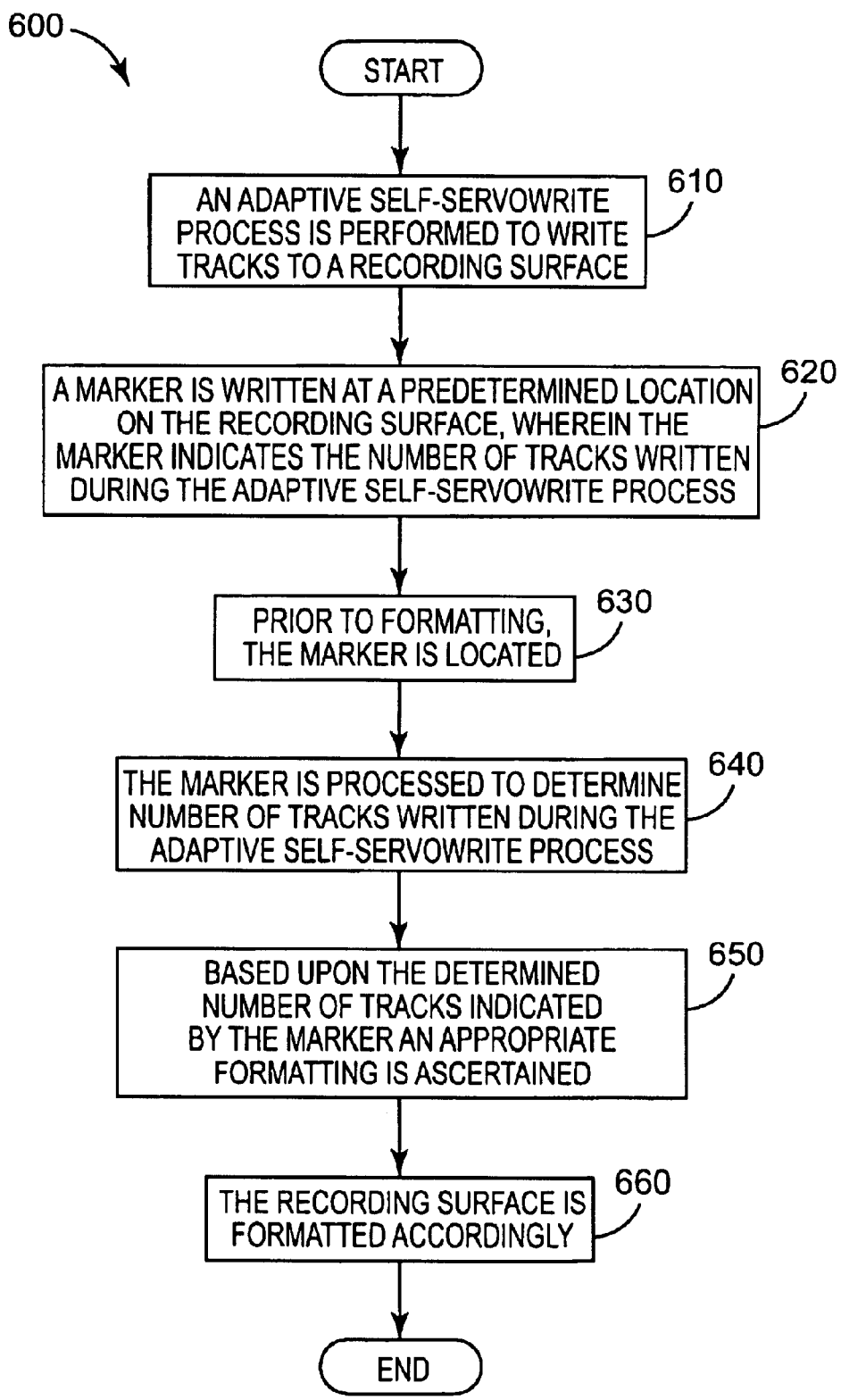
FIG. 6 illustrates a flow chart of the method for providing adaptive formatting via a self-servowrite process according to the present invention.

FIG. 6 illustrates a flow chart 600 of the method for providing adaptive formatting via a self-servowrite process according to the present invention. In FIG. 6, an adaptive self-servowrite process is performed to write a variable number of tracks to a recording surface 610. A marker is written at a predetermined location on the recording surface, wherein the marker indicates the number of tracks written during the adaptive self-servowrite process 620. Prior to formatting, the marker is located 630 and processed to determine number of tracks written during the adaptive self-servowrite process 640. Based upon the determined number of tracks indicated by the marker an appropriate formatting is ascertained 650. The recording surface is formatted accordingly 660.

Referring again to FIG. 4, the process illustrated with reference to FIGS. 5–6 may be tangibly embodied in a computer-readable medium or carrier, e.g. one or more of the fixed and/or removable data storage devices 468 illustrated in FIG. 4, or other data storage or data communications devices. A computer program 490 expressing the processes embodied on the removable data storage devices 468 may be loaded into the memory 492 or into the servo controller 444, e.g., in a processor (not shown), to configure the servo controller 400 of FIG. 4, for execution. The computer program 490 comprise instructions which, when read and executed by the servo controller 444 of FIG. 4, causes the servo controller 400 to perform the steps necessary to execute the steps or elements of the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for providing adaptive formatting via a self-servowrite process, comprising:
    performing an adaptive self-servowrite process to write tracks to a recording surface;
    writing a marker at a predetermined location on the recording surface, the marker indicating the number of tracks written during the adaptive self-servowrite process;
    prior to formatting, locating the marker;
    processing the marker to determine a number of tracks written during the adaptive self-servowrite process;
    ascertaining an appropriate formatting based upon the determined number of tracks indicated by the marker; and
    formatting the recording surface according to the ascertained format.

2. The method of claim 1 wherein the writing a marker further comprises writing a marker toward an inner edge of the recording surface.

3. The method of claim 1 wherein the writing a marker further comprises writing a marker toward an outer edge of the recording surface.

4. The method of claim 1 wherein a ramp is disposed adjacent an outer edge of the recording surface, and wherein the writing a marker toward the outer edge of the recording surface comprises writing the marker just inside the ramp.

5. The method of claim 1 wherein the writing a marker further comprises writing a grey code servo address indicating the number of tracks written during the adaptive self-servowrite process.

6. The method of claim 1 wherein the processing the marker to determine a number of tracks written during the adaptive self-servowrite process further comprises processing the mark with a servo demodulator.

7. The method of claim 1 wherein the locating the marker further comprises performing a servo command requesting the mark be located during a function test.

8. A servo written recording medium, comprising a number of tracks written during an adaptive self-servowrite process and a marker disposed at a predetermined location on the recording surface, wherein the marker indicates the number of tracks written during the adaptive self-servowrite process.

9. The servo written recording medium of claim 8 further comprising a ramp disposed at an outer edge of the recording medium.

10. The servo written recording medium of claim 9 wherein the marker is located toward the outer edge of the recording surface just inside the ramp.

11. The servo written recording medium of claim 8 wherein the marker is located toward an outer edge of the recording surface.

12. The servo written recording medium of claim 8 wherein the marker is located toward an inner edge of the recording surface.

13. The servo written recording medium of claim 8 further comprising a grey code servo address at the marker for use in determining the number of tracks written during the adaptive self-servowrite process.

14. The servo written recording medium of claim 8 wherein the number of tracks indicated by the marker is associated with a predetermined formatting for the recording medium.

15. A storage system for providing adaptive formatting via a self-servowrite process, comprising:
    a moveable storage medium having a recording surface for storing data thereon;
    a motor for causing movement of the moveable storage medium;
    an actuator assembly having an actuator arm and a sensor disposed at a distal end of the actuator arm, the sensor for reading and writing data on the disk;
    a servo controller, operatively coupled to the actuator assembly and sensor, the servo controller providing a drive signal to the actuator assembly for moving the actuator arm relative to the recording medium, the servo controller performing an adaptive self-servowrite process to write a number of tracks to a recording surface, writing a marker at a predetermined location on the recording surface, the marker indicating the number of tracks written during the adaptive self-servowrite process, prior to formatting, locating the marker, processing the marker to determine number of tracks written during the adaptive self-servowrite process, ascertaining an appropriate formatting based upon the determined number of tracks indicated by the marker and formatting the recording surface according to the ascertained format.

16. The storage system of claim 15 wherein the servo controller writes the marker toward an inner edge of the recording surface.

17. The storage system of claim 15 wherein the servo controller writes the marker toward an outer edge of the recording surface.

18. The storage system of claim 15 wherein a ramp is disposed adjacent an outer edge of the recording surface, the servo controller writing a marker toward the outer edge of the recording surface just inside the ramp.

19. The storage system of claim 15 wherein the marker is written by the servo controller toward an outer edge of the recording surface just inside a ramp.

20. The storage system of claim 15 wherein the marker further comprises a grey code servo address indicating the number of tracks written during the adaptive self-servowrite process.

21. The storage system of claim 15 further comprising a servo demodulator for processing the grey code servo address to ascertain the number of tracks written during the adaptive self-servowrite process.

22. The storage system of claim 15, wherein the number of tracks indicated by the marker being associated with a predetermined formatting for the recording medium.

23. An article of manufacture comprising a program storage medium readable by a computer, the medium tangibly embodying one or more programs of instructions executable by the computer to perform a method for providing adaptive formatting via a self-servowrite process, the method comprising:

performing an adaptive self-servowrite process to write tracks to a recording surface;

writing a marker at a predetermined location on the recording surface, the marker indicating the number of tracks written during the adaptive self-servowrite process;

prior to formatting, locating the marker;

processing the marker to determine a number of tracks written during the adaptive self-servowrite process;

ascertaining an appropriate formatting based upon the determined number of tracks indicated by the marker; and formatting the recording surface according to the ascertained format.

24. The article of manufacture of claim 23 wherein the writing a marker further comprises writing a marker toward an inner edge of the recording surface.

25. The article of manufacture of claim 23 wherein the writing a marker further comprises writing a marker toward an outer edge of the recording surface.

26. The article of manufacture of claim 23 wherein a ramp is disposed adjacent an outer edge of the recording surface, and wherein the writing a marker toward the outer edge of the recording surface comprises writing the marker just inside the ramp.

27. The article of manufacture of claim 23 wherein the writing a marker further comprises writing a grey code servo address indicating the number of tracks written during the adaptive self-servowrite process.

28. The article of manufacture of claim 23 wherein the processing the marker to determine number of tracks written during the adaptive self-servowrite process further comprises processing the mark with a servo demodulator.

29. The article of manufacture of claim 23 wherein the locating the marker further comprises performing a servo command requesting the mark be located during a function test.

* * * * *